United States Patent Office 2,781,241
Patented Feb. 12, 1957

2,781,241

METHOD OF TREATING ANIMAL SKINS

Alexis E. Ushakoff, Beverly, Mass., assignor to Secotan, Inc., Somerville, Mass., a corporation of Massachusetts No Drawing. Application December 24, 1951,
Serial No. 263,129

2 Claims. (Cl. 8—94.18)

This invention relates to the treatment of fibrous animal skins, hides, pelts, membranes and the like, and it comprises a novel process for imparting to such materials certain desired physical characteristics in such a manner that these characterstics may be retained through subsequent treatments. With respect to the tanning of skins, this invention comprises a novel process for adjusting the texture of the skin to any desired degree and for fixing that texture into the skin structure so that subsequently the reactivity of the skin substance toward the tanning agent may be adjusted and tanning may be accomplished without affecting the texture.

The term "skin" is used hereinafter to refer generically to animal hides, skins and pelts, and similar fibrous animal membranes.

"Texture" is used herein to refer to the quality of the skin regarding its plumpness, firmness, and surface characteristics. This quality is dependent chiefly on the spacial arrangement of the fibers and on their condition of solvation or hydration as hereinafter explained.

The dermal layer, or corium, of animal skins consists essentially of closely interwoven and intergrown fibers of the protein collagen. This protein is a highly hydrophilic colloid and will swell in water to form a colloidal gel which is similar in many respects to a gelatine gel. Collagen, like all proteins, contains both amino and carboxyl radicles and it can be represented by the structural formula $$NH_2\text{---}R\text{---}COOH$$

It is amphoteric and can accordingly dissociate or ionize as either an acid or a base. Variations in the hydrogen-ion concentration of a water-wet skin affect the degree of ionization or dissociation of the protein and consequently cause variations in both the electrostatic charge carried by the protein and the affinity of the protein for the liquid. This latter effect is demonstrated by the degree to which the skin swells. At the isoelectric point the dissociation is a minimum and the net electrostatic charge is zero. At this point swelling is also a minimum. Raising the hydrogen-ion concentration above the isoelectric point, as by adding acid to the skin, causes dissociation through the amino groups and imparts a positive charge to the protein. Acidified protein can be represented by the formula

$$[NH_3\text{---}R\text{---}COOH]^+$$

Dissociation increases with increasing hydrogen ion concentration and the affinity of the protein for the liquid in which it is placed is correspondingly increased. Consequently, acidifying a skin whose hydrogen ion concentration is at or above the isoelectric point causes the skin to swell and causes the skin protein to become more positively charged.

Similarly, lowering the hydrogen ion concentration below the isoelectric point causes ionization or dissociation of the protein through the carboxyl groups, and a negative charge is acquired by the collagen. Basic protein can be represented by the structural formula

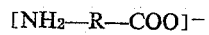
$$[NH_2\text{---}R\text{---}COO]^-$$

Accordingly, adding a base to a skin whose hydrogen ion concentration is at or below the isoelectric point also causes the skin to swell and causes the skin protein to become more negatively charged.

The fact that the skin protein is affected both chemically and physically by the hydrogen ion concentration of liquids in which a skin is placed has imposed serious limitations on the processes for treating skins, especially the tanning processes. It is often necessary to control the texture, or degree of swelling of the skin and at the same time to adjust the chemical composition or electrostatic charge of the skin protein to impart to it the proper reactivity toward the tanning agent. More often than not the desired reactivity is not imparted by the hydrogen-ion concentration necessary to impart the desired texture, and any attempt to adjust the hydrogen-ion concentration to bring about the proper reactivity would alter the texture of the skin.

For instance, vegetable tannins consist of negatively charged colloidal sols which are believed to react by coprecipitating with the protein on the fibers thereby rendering the skin insensitive to water. The mutual reactivity of the skin and the tanning agent must be such that the tanning agent can penetrate the skin and become deposited throughout. If a plump leather is desired, as sole leather, the skin must be made acid in order to induce the proper degree of swelling and to impart positive charges to the protein which will effectuate a precipitation of the negatively charged tanning agent. However, an acid plumped skin is so positively charged that if exposed to a strong solution of tanning agent precipitation of tanning agent on the outer surfaces of the skin would be so violent that the pores of the skin would become clogged and prevent the penetration of tanning agent into the body of the skin. If, on the other hand, the acidity of the skin be reduced to the point where the positive charges on the protein are less abundant so that precipitation of tanning agent would occur throughout the skin, the plumpness of the skin would be lost. Consequently, acid plumped leather is produced conventionally by treating the skin first with acidic spent tan liquor having a very low concentration of tanning agents and gradually subjecting it to stronger liquors in order to allow for thorough penetration of the skin by the tanning solution. The process is extremely time consuming and it often requires several months to tan a hide.

Although chrome tanning apparently is not effected by a coprecipitation, but rather by a chemical combination of the chrome-complex present in the tanning solution and the collagen of the skin to form a chrome-collagen-complex, the hydrogen-ion concentration of the protein must, nevertheless, be adjusted prior to the tanning operation in order to impart to it the proper reactivity toward the tanning solution. The chrome-complex is soluble in acid solutions and the skin must therefore be highly acid in order that the tanning solution can penetrate it easily without precipitating. Unless a plump skin is desired special precautions are necessary to prevent the skin from swelling too much. The general practice has been to incorporate salt in the acidifying medium and thereby reduce the affinity of the skin for the liquid.

This invention provides a process for adjusting the texture of skins, hides, pelts and similar animal membranes in such a manner that thereafter the chemical structure or electrostatic charge of the protein may be

modified as desired without altering the previously imparted texture. This invention provides means for tanning or dyeing or other treatment of fibrous animal membranes in far less time than has heretofore been required and without the special manipulation of the reagents used to treat the protein material that has in the past been necessary. The process of this invention can be utilized advantageously in any treatment of fibrous animal membranes where it is necessary to control both the texture of the membranes and the acidity or electrostatic charge or degree of dissociation of the protein each independently of the other. This invention also provides a means for adjusting the plumpness and texture of a skin over a range not heretofore utilized.

I have discovered that the limitations previously imposed by the mutual dependency of physical structure and chemical nature of the skin substance can be avoided by replacing substantially all water that may be present in the skin with certain organic liquids and thereafter processing the skin under substantially non-aqueous conditions. This invention will best be understood if I first describe briefly the observations I have made regarding the differences between the behavior of skin protein in the presence of water and the behavior of skin protein in the presence of organic liquids.

Skin protein is highly hydrophilic and can be hydrated and dehydrated reversibly; a dehydrated or dried skin, when brought in contact with water, will hydrate. The degree of hydration in turn controls in part at least, the corpulence or plumpness of the skin, and it can be controlled by taking advantage of the amphoteric properties of the skin protein by varying the hydrogen ion concentration of the skin-water system. Upon being dried by evaporation of the water a hydrated skin shrinks to a compact translucent and horny membrane which can be hydrated only with difficulty because of the densification. Furthermore, drying the skin causes the skin fibers to coalesce at their points of contact and wetting the skin does not break these fusions. Consequently it has heretofore been considered essential to keep a skin wet until tanned when treated under aqueous conditions.

In contradistinction, if the water of a hydrated skin be replaced with certain organic liquids, a skin is obtained which is solvated more or less to the same extent it was hydrated prior to the replacement. In this solvated condition the degree of solvation can be reversibly altered by varying the hydrogen ion concentration of the skin-solvent system, much the same as when the skin is in water, and the skin swells and shrinks with these hydrogen-ion concentration variations. However, if the skin is desolvated, as by drying, it behaves markedly different than it does in water. Desolvation is irreversible, the skin apparently having lost most of its affinity for the solvent, and the skin will not again swell and solvate when brought in association with the solvent, and its texture will not be altered by variations in hydrogen-ion concentration. Moreover, desolvation, unlike dehydration, does not result in a physical shrinking of the skin but rather occurs without materially altering the spacial arrangement of the protein fibers, and a desolvated skin has not lost the texture it attained when in the solvated condition.

By varying the hydrogen-ion concentration of the solvated skin in an organic solvent system a remarkable degree of control over the swelling or plumpness as well as the surface characteristics and firmness or looseness of the fibrous skin structure can be realized. The aggregate of these properties is referred to as the "texture" of the skin. Adding an acid to the skin solvent system to raise the hydrogen-ion concentration above the iso-electric point results in a swelling of the fibers and a texture of smooth grain and compact rather stiff structure, the degree to which these properties are realized being dependent in part on the extent to which the hydrogen-ion concentration is above the iso-electric point. Adding a base to the skin solvent system to lower the hydrogen-ion concentration below the iso-electric point also causes a swelling but results in a skin texture of coarse grain and an open and rather soft pliable structure. At the iso-electric point, swelling is at a minimum and the skin has a compact yet flexible structure with a maximum of skin protein per unit cross sectional area. The degree of control over the texture of the skin afforded by variations in the hydrogen-ion concentration of the skin solvent systems is an important feature of this invention as is explained below.

Separate degrees of control over the swelling are offered by the variations in the affinities of the various solvents for the skin protein, and by the influence of dissolved salts. I have found that certain solvents cause greater swelling of skin protein and accordingly can be used to increase or intensify the characteristics imparted by making the skin solvent system acidic or basic. Similarly, solvents having a lesser a affinity for the skin protein can be used to attenuate the characteristics imparted by acids or bases, and to enhance the densification of the skin structure at the iso-electric point. It has been found in general that the extent to which a solvent will cause swelling of the skin is dependent in part on the polarity of the solvent; the more polar solvents appear to cause greater swelling than the less polar ones. The presence of dissolved salts also affects the texture of a solvated skin in much the same manner as such salts affects the texture of a hydrated skin.

It will be understood that the control exercised over the texture of the skin by means of varying the hydrogen-ion concentration and changing the solvent and adding salts relates to the skin while it is in a solvated condition, inasmuch as desolvation, as pointed out above is irreversible. Desolvation causes a fixing of the texture of the skin.

A final observation I have made regarding the behavior of a skin in an organic liquid system relates to tanning. Chrome or inorganic salt tanning in an organic system appears to be very similar to the same process when carried out in water. The tanning agent is soluble in acid solutions, and can be introduced into the skin in this manner. Thereafter the skin is neutralized with a base to effect a precipitation or coreaction of the tanning agent on or with the skin protein. Vegetable tanning in aqueous solutions is effected by introducing the tanning agent into an acid skin where it precipitates or deposits on the skin protein without further treatment. One explanation is that the tanning agent is a negatively charged sol which coprecipitates on the positively charged acid skin protein. However, in organic solvents the vegetable tanning agents behave markedly similarly to inorganic tanning agents. They are generally soluble in acidic solution and rendered insoluble by adding a base to the organic tannin-impregnated skin. A skin thus treated, however, is not truly tanned because the vegetable tannin-skin combination is not hydrophobic. A final step, comprising acidification of the tannin-skin combination, must be undertaken to render the tannin-skin combination hydrophobic, hence tanned.

Inasmuch as tanning agents are generally acid, the introduction of them into a solvated skin results in a texture change if the texture has not been fixed into the skin by drying it. It has been found that tanning agents may be used to alter the texture of the skin, by virtue of their hydrogen ion concentration, solvent, and salt content features, and that the texture thus imparted may further be modified by subsequent treatment with acids, bases, salts and solvents as explained above. In any case, it has been found that the texture of the skin is not permanently fixed until the skin is dried.

The effect of tanning is that it affects the permanency of the texture fixed by drying. As explained above, an untanned skin, when dried, has a fixed texture with respect to the solvent dried from it. But this skin is still hydrophilic and may be wet with water, wherein the texture is no longer fixed. That is why it is important in the process of this invention that the treatment after the texture is fixed be carried out under nonaqueous conditions. If a tanned skin is dried, however, to fix its texture, it will not be rehydrated when treated with water, since the tanning process renders the skin hydrophobic.

From the foregoing it will be appreciated that the process of this invention is essentially a process for adjusting and fixing the texture of a skin, or the like, independently of the tanning step which may be carried out after the texture is fixed or which may be followed by a texture adjusting and fixing treatment.

This invention is predicated on the application of these observations and discoveries to the treatment of animal skins. The process of this invention comprises the steps of replacing the water in a skin with an organic liquid, preferably one which is miscible with water, either before or after the texture of the skin is adjusted. Next the skin having the desired texture, which may have been imparted prior to the dehydration step, but is preferably imparted to the solvated skin, is dried to fix the texture in the skin structure. Thereafter the once-dried skin in the desolvated condition may be treated under substantially non-aqueous conditions with acidic or basic reagents to modify its chemical structure according to its amphoteric nature to impart to the skin the desired reactivity toward reagents subsequently used to treat it. Since the skin has been irreversibly desolvated, modification of the chemical structure proceeds without appreciable change in texture.

It will thus be seen that this invention provides a means for controlling, (1) the texture respecting plumpness or degree of swelling, surface characteristics, and firmness, and (2) the chemical structure or electrostatic charge on the protein of the skin, each independently of the other. Thereby one of the most serious limitations on the processes for treating hides, skins, or pelts, especially the tanning process, is avoided since by this invention the skin may be modified chemically, after the texture is fixed and, hence, independently of the physical structure, to control its reactivity toward reagents used in subsequent operations on the skin. Alternatively, the skin may first be treated with tanning agents and subsequently the texture may be adjusted and fixed. Such reagents need not be applied to the skin under precautions imposed by the chemical structure of the skin associated with its texture once the texture is fixed and the chemical structure becomes variable independently thereof.

Accordingly the process of this invention is carried out by first replacing the water in a skin, either fresh, bated or pickled, with an appropriate water-miscible organic liquid. Any ordinary organic solvent characterized by the properties of water miscibility and substantial neutrality is effective since the role of the solvent is chiefly physical rather than chemical, the solvent serving as a medium for the skin and the reagents used to treat it. Liquids which are solvents for skin protein or which are chemically reactive toward it are, of course, to be avoided, and it will be understood that the term "solvent" refers to those organic liquids ordinarily known as solvents. Examples include the alcohols: methanol, ethanol, normal propyl and isopropyl; the ketones: acetone and methyl ethyl ketone; the esters: methyl acetate, ethyl acetate, isopropyl acetate, methyl propionate, ethyl propionate, isopropyl propionate; the glycols: ethylene glycol, diethylene glycol and polyethylene glycol; the glycol ethers: cellosolve (ethylene glycol monoethyl ether), methyl cellosolve (ethylene glycol monomethyl ether), carbitol (diethylene glycol monoethyl ether), methyl carbitol (diethylene glycol monomethyl ether) and butyl carbitol (diethylene glycol monobutyl ether). Other similar organic solvents may also be used.

The water may be replaced with solvent by drumming the water-wet skins in the solvent, and changing the solvent, if necessary, when it becomes diluted with water. Ordinarily the skins may be drummed in solvent until the water content of the solvent in equilibrium with the skin substance is less than 3% by weight. Alternatively I may support the skins on a suitable surface and force the solvent through the skins either by applying a vacuum to the underside or by applying a positive pressure to the liquid above the skin.

When the skin reaches equilibrium with the solvent it is substantially dehydrated, the water having been replaced with the solvent. The solvent not only fills the voids or interstices in the fibrous structure but is also present in the protein itself where it solvates the protein, the structure being a protein-solvent organogel.

Since the water extraction and solvation step of this invention produces a skin solvated more or less to the same extent to which it was hydrated prior to extraction, it will be seen that the texture can be adjusted in the hydrated skin and retained in the solvated skin. However, according to the preferred embodiment of this invention the water wet skin is brought to a condition of minimum hydration prior to the solvent extraction step. In this condition swelling is at a minimum and the structure has a maximum porosity. Accordingly, the extraction and dehydration can be achieved most rapidly since penetration of the organic solvent into the skin structure is effected with a great ease. In contradistinction, introducing a swollen skin, such as an acid plumped hide, into the organic solvent results in very slow extraction since the interstitial voids are chiefly filled with swollen skin protein and it is difficult for the solvent to enter and penetrate the skin. This preferred condition of minimum swollenness may be achieved by pickling the skin in a salt and acid solution wherein skin acquires a porous open structure. Alternatively the skin may be adjusted to its iso-electric point, as by bating the skin, where swelling is a minimum.

The solvated skin resulting from the extraction of water from the skin in a condition of minimum hydration is in a condition of minimum solvation. The texture may now be adjusted as by treating the skin with an acid or base and if desired with other organic solvents which will solvate to a greater or lesser extent than the one used for extraction, which may, if desired, contain dissolved salts which also affect the texture. Conveniently the skin is removed from the extraction bath and introduced into a solvent solution of the desired acidity and solvent, both being chosen to impart the desired texture as explained above. Alternatively the acid or base may be added to the extraction bath after the extraction is complete as indicated by an equilibrium water content in the bath of less than 3%.

The solvated skin having the desired texture or plumpness is next dried, and in accordance with this invention, the texture of the skin is thereby fixed in the skin structure so long as the skin is maintained under non-aqueous conditions while in a hydrophilic condition. It will be understood that the desolvated skin is still hydrophilic and if wet with water it would behave therein as any water-wet skin. After the skin is tanned, however, it is no longer sensitive to water; the tanning process having rendered the skin protein non-hydrophilic. Accordingly the skin must be maintained under substantially non-aqueous condition until it is tanned.

Desolvation may be effected simply by drying the skin, with or without the aid of heat, and preferably under conditions adapted for solvent recovery, as in a vacuum chamber.

With the skin in an irreversibly desolvated condition, and the texture fixed in the skin structure with respect to the solvents, it may be made acid or basic to any desired degree due to its amphoteric nature in order to impart to it the proper reactivity toward reagents subsequently to be used in treating it, such as tanning or dyeing agents. Since any particular agent will require for the desired reactivity a particular acidity or electrostatic charge, depending on whether the agent reacts chemically with the skin protein or electrostatically precipitates from a colloidal solution, the nature of the adjustment of the skin protein will depend on the agent and the desired reactivity of the skin toward the agent.

As pointed out above most tanning agents in organic solvents are soluble in acid solution and precipitate from basic solutions. Tanning requires a precipitation or deposition of tanning agent on the skin protein. Accordingly a skin reactive toward tanning agents is generally basic, and is acid if the reactivity of the skin toward the tanning solution is to be low, as is desired when rapid penetration of densely precipitating material is sought. Dyes may be either acid or base precipitating and accordingly a skin reactive toward a dye may be either acid or basic depending on the dye.

The chemical structure, or reactivity, of the skin protein is adjusted in the same way the texture is adjusted, that is, by introducing the once-dried and irreversibly desolvated skin into an organic solvent of the desired hydrogen ion concentration, determined by the nature of reagents to be used subsequently and the desired reactivity of the skin toward that reagent. As pointed out above, an alternative procedure calls for the conditioning of the skin for treatment with tanning agents, dyeing agents and the like prior to the adjustment of the texture, in which case the skin is not dried until subsequently, after the desired texture has been imparted. It will be understood, however, that whether this alternative procedure is feasible depends upon the susceptibility of the skin after treatment with tanning agents, dyeing agents and the like to subsequent chemical treatments. A texture adjusting treatment subsequent to the treatment of the skin with a tanning agent, for instance, is not feasible if its effect on the tanning agent is to dissolve it from the skin. Accordingly, the preferred embodiment of this invention consists in the procedure whereby the texture is first adjusted and fixed, and subsequently the skin is further treated.

From the foregoing description it will be seen that the process of this invention may have a great number of variations. The following detailed examples have been selected as illustrative of representative embodiments of this invention as it pertains to the treatment of animal skins.

*Example 1*

A pickled skin is dehydrated in acetone then treated with acid and dried. The dried skin is then treated with a basic acetone solution, and dried. The texture is not altered by this latter treatment with a base.

A wet pickled cowhide weighing 584 grams was drummed repeatedly in acetone until the acetone had a constant specific gravity of 0.792 at 70° F. The skin was then drummed in a solution consisting of:

Conc. hydrochloric acid _____cc__ 22
Acetone _____cc__ 1000

The skin was then removed and again drummed in acetone, to rinse off excess acid, until the specific gravity of the supernatant acetone was 0.792 at 70° F. The skin was then dried. The dried skin was cut in half. One half was then drummed in a basic solution consisting of:

Butylamine _____cc__ 5
Acetone _____cc__ 250 rinsed in acetone to a specific gravity of 0.792 at 70° F. and dried. A comparison of this half with the other revealed that both pieces of the skin possessed identical textures. The subsequent treatment of the one half in a basic solution resulted in no alteration of the texture, which was fixed by the first drying.

*Example 2*

A wet depickled skin is dehydrated in acetone, then treated with acid and dried. The dried skin is treated with a basic acetone solution then with a vegetable tanning solution then with acid and dried. Its texture is that imparted during the first acid treatment, prior to drying.

A wet depickled cowhide weighing 1204 grams was washed with water to remove excess salt. The skin was then drummed repeatedly in acetone until the acetone had a constant specific gravity of 0.792 at 70° F. 1030 grams of this skin was then drummed in an acid solution consisting of:

Conc. hydrochloric acid _____cc__ 31
Acetone _____cc__ 1500 rinsed in acetone to remove excess acid until the specific gravity of the supernatant acetone was 0.792 at 70° F., and dried. A piece of the dried skin weighing 750 grams (acetone-wet basis) was drummed in a basic solution consisting of:

Ammonium hydroxide (conc. commercial)___cc__ 50
Acetone _____cc__ 1000 and then rinsed in acetone, to remove excess base, until the specific gravity of the supernatant acetone was 0.792 at 70° F. A piece of this skin weighing 464 grams was drummed in a vegetable tanning solution consisting of:

Quebracho solution _____cc__ 928
Ammonium hydroxide (conc. commercial)___cc__ 3.1

The quebracho solution consisted of:

Quebracho extract _____grams__ 600
Methanol _____cc__ 2400
Conc. hydrochloric acid_____cc__ 20 combined by mixing the acid with the methanol, then adding the quebracho extract, tumbling for 24 hrs. and filtering.

The skin was then rinsed in acetone until the washings were clear. A piece of this skin, weighing 240 grams, was then tumbled in a solution consisting of:

Glacial acetic acid_____cc__ 4.8
Acetone _____cc__ 1000 rinsed in acetone until the washings were clear and dried. A comparison of the skins revealed that the acid texture imparted when the skin was treated with the acetone-acid solution had been fixed by the drying operation and was retained throughout the subsequent treatments. The final treatment with acetic acid was for the purpose of insolubilizing the quebracho tannin to render the skin hydrophobic, and hence tanned with respect to water.

*Example 3*

A wet pickled skin is washed with water then depickled. It is then dehydrated in acetone, treated with a basic acetone solution and dried. The skin is then acidified in acetone and tanned with chrome. Its texture is that imparted during the first basic treatment.

A wet pickled cowhide weighing 1855 grams was washed thoroughly in water and then drummed in a concentrated aqueous solution of sodium bicarbonate to render it substantially neutral and depickled. The skin was then drummed in acetone repeatedly until the specific gravity of the supernatant acetone was 0.792 at 70° F. A piece of this skin weighing 1665 grams was drummed in a solution consisting of:

Ammonium hydroxide (conc. commercial)____cc__ 75
Acetone _____cc__ 2000 to impart to it a basic texture, then dried. A section of this skin weighing 1445 grams (acetone wet basis) was drummed in a solution consisting of:

| | |
|---|---|
| Conc. hydrochloric acid_____cc__ | 85 |
| Acetone _____cc__ | 2000 | and was then drummed in a tanning solution consisting of:

| | |
|---|---|
| Chrome solution _____cc__ | 142 |
| Acetone _____cc__ | 2000 |

The chrome solution consisted of:

| | |
|---|---|
| Chromic chloride _____grams__ | 1000 |
| Methanol to make up volume of 1000 cc. | | mixed by tumbling the ingredients together until the chromic chloride is dissolved, then refluxing until no precipitation occurs when acetone is added.

The skin was subsequently rinsed with acetone until the washings were clear, and then dried. Thereafter it was exposed to an atmosphere of trimethylamine vapors to neutralize and insolubilize the chrome and render the skin hydrophobic. It was found that the basic texture imparted when the skin was treated with the acetone-ammonia solution was retained throughout subsequent treatments.

*Example 4*

A pickled skin is rinsed in water, swelled in acid then dehydrated in acetone and dried to fix the swollen texture. The skin is subsequently treated with a basic acetone solution and vegetable tanned. The acid swollen texture exists in the tanned skin.

A wet pickled cowhide weighing 1032 grams was washed thoroughly in running water until the salt content was not more than 0.5 milligram sodium chloride per cubic mentimeter of 4000 cubic centimeters of water in equilibrium with the skin. Twelve cc. of concentrated sulfuric acid was then added to the water (4000 cc.), and the skin was drummed in the acidified water whereupon it acquired a swollen acid texture. The skin was then drummed repeatedly in acetone until the acetone had a specific gravity of 0.792 at 70° F., and dried. A piece of this skin weighing 885 grams (acetone wet basis) was drummed in a solution consisting of:

| | |
|---|---|
| Ammonium hydroxide (conc. commercial)_____cc__ | 100 |
| Acetone _____cc__ | 1000 | and again rinsed in acetone until the supernatant acetone had a specific gravity of 0.792 at 70° F. A piece of this skin weighing 645 grams was then drummed in a solution consisting of:

| | |
|---|---|
| Quebracho solution of Example 2_____cc__ | 1280 |
| Ammonium hydroxide (conc. commercial)____cc__ | 2 |

Thereafter the skin was rinsed in acetone until clear washings were obtained. A piece of the skin weighing 355 grams was then drummed in a solution consisting of:

| | |
|---|---|
| Conc. hydrochloric acid_____cc__ | 1 |
| Acetone _____cc__ | 1000 | to insolubilize the quebracho and render the skin hydrophobic, and finally dried. It was found that the swollen acid texture was retained by the tanned skin.

In all the examples treatment was at room temperature, about 70° F.

The examples above are presented to show that a skin may be given any desired texture, and that the texture may be fixed into the skin by drying it, so that subsequent treatments may be given the skin to adjust its reactivity toward agents later used to treat it, such as tanning agents. In this connection it is again noted that once the skin has been dehydrated by means of an organic solvent and dried, the texture the skin had just prior to drying is fixed in the skin as long as the skin is not rewet with water before it is tanned. It will be seen from the examples that it is not essential that organic solutions used to treat the skin after it is dried be anhydrous. Minor amounts of water may be present as long as there is not enough to hydrate the skin.

In the examples the texture was controlled by varying the hydrogen-ion concentration of the skin but other means for varying the texture may also be employed. For instance, the skin may be treated with a different solvent from the one used to dehydrate the skin—a skin dehydrated in acetone may be treated with methanol to enhance its swollenness—or salts may be added to decrease swelling. After the texture has been fixed, by drying the skin, subsequent agents, which ordinarily are active to alter the skin texture, may be used to treat the skin without affecting its texture. Thus it will be appreciated that this invention provides a process of treating skins whereby a degree of control over the condition of the skin, and the resultant tanned leather, may be had which was not heretofore available.

It is contemplated that modifications of the processes described herein will be apparent to those skilled in the art and that such modifications may be made without departing from the scope of this invention.

This application is a continuation-in-part of my copending application Serial No. 100,965 filed June 23, 1949, now abandoned.

Having thus disclosed my invention and described in detail preferred and representative embodiments thereof, I claim and desire to secure by Letters Patent:

1. The method of tanning skins consisting of extracting and replacing all the water of a water-wet skin with an inert water-miscible organic solvent, then treating the skin with an organic solvent solution of a chemical agent effective to change the degree of swelling of the skin to impart the desired texture, thereafter drying the skin, then tanning the skin in an inert organic solvent solution of a tanning agent while maintaining the skin under non-aqueous conditions until the skin is finally tanned and dry.

2. The method of fixing the texture of a skin consisting of extracting and replacing substantially all the water in the skin with an inert water-miscible organic solvent, treating the skin with an inert organic solvent solution of a chemical agent effective to change the degree of swelling of the skin to impart the desired texture to the skin, and then drying the skin of solvent, then tanning the skin in an inert organic solvent solution of a tanning agent while maintaining the skin under non-aqueous conditions until the skin is finally tanned and dry.

References Cited in the file of this patent

UNITED STATES PATENTS

| 2,109,572 | Lloyd _____ Mar. 1, 1938 |
| 2,523,326 | Putnam _____ Sept. 26, 1950 |

FOREIGN PATENTS

| 118,155 | Australia _____ Feb. 16, 1944 |

OTHER REFERENCES

"The Chemistry of Leather Manufacture," by McLaughlin and Thies, pages 586 and 587, pub. 1945 by Reinhold Publ. Corp.

Roddy: J. A. L. C. A., pages 184–194, vol. 38, 1943.

Progress in Leather Science, 1920–1945, pages 487–492, 158, 164, 527–546, Lloyd, pub. by Br. Lea. Mfg. Res. Assoc., London, England.